(12) United States Patent
Katano

(10) Patent No.: US 9,990,166 B2
(45) Date of Patent: Jun. 5, 2018

(54) INFORMATION PROCESSING SYSTEM IN WHICH CONNECTION FOR JOB TRANSMISSION IS ESTABLISHED, PROCESSING APPARATUS, AND SERVER

(71) Applicant: CANON KABUSHIKI KAISHA, Tokyo (JP)

(72) Inventor: Kiyoshi Katano, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/164,516

(22) Filed: May 25, 2016

(65) Prior Publication Data

US 2016/0350041 A1 Dec. 1, 2016

(30) Foreign Application Priority Data

May 28, 2015 (JP) .................................. 2015-109180

(51) Int. Cl.
| | |
|---|---|
| *G06F 3/12* | (2006.01) |
| *H04L 29/06* | (2006.01) |
| *H04L 29/08* | (2006.01) |
| *H04N 1/00* | (2006.01) |
| *G06K 15/00* | (2006.01) |

(52) U.S. Cl.
CPC ............ *G06F 3/1236* (2013.01); *G06F 3/122* (2013.01); *G06F 3/1206* (2013.01); *G06F 3/1288* (2013.01); *H04L 67/025* (2013.01); *H04L 67/141* (2013.01); *H04L 69/18* (2013.01); *H04N 1/00127* (2013.01)

(58) Field of Classification Search
None
See application file for complete search history.

(56) References Cited

U.S. PATENT DOCUMENTS

| | | | |
|---|---|---|---|
| 2012/0194863 A1* | 8/2012 | Oshima ................. | G06F 3/1204 358/1.15 |
| 2012/0194864 A1* | 8/2012 | Oshima ................. | G06F 3/1204 358/1.15 |

FOREIGN PATENT DOCUMENTS

JP 5565346 B2 8/2014

* cited by examiner

*Primary Examiner* — Dov Popovici
(74) *Attorney, Agent, or Firm* — Canon U.S.A., Inc. IP Division

(57) ABSTRACT

One or more servers transmit a job to a processing apparatus in response to a request from the processing apparatus. The one or more servers transmit a job to the processing apparatus in response to a request from a device different from the processing apparatus when a predetermined registration process for registering the processing apparatus has been performed. The connection between the processing apparatus and the one or more servers to transmit the job is established in accordance with whether the predetermined registration process has been performed.

22 Claims, 13 Drawing Sheets

INFORMATION PROCESSING SYSTEM IN WHICH CONNECTION FOR JOB TRANSMISSION IS ESTABLISHED, PROCESSING APPARATUS, AND SERVER

BACKGROUND OF THE INVENTION

Field of the Invention

The present invention relates to an information processing system including one or more servers, and a processing apparatus.

Description of the Related Art

Services in which a Web server notifies a processing apparatus of a job, for example, for printing or reading a document, so that the processing apparatus performs the job have been provided. The user of the service can create a job by using the service via a remote terminal including the Web browser, such as a personal computer or a mobile terminal, different from the processing apparatus used to perform the job. In such a service, the identification information about the processing apparatus is linked to the user account of the service user and registered in the Web server. Thus, the Web server notifies the processing apparatus registered and linked to the user account of the service user who issues the job of the job.

Japanese Patent No. 5565346 describes that a printer is connected to a server when the printer is turned on so that the printer is constantly connected to the server via the Internet while the printer is in the power-on state. The server notifies the printer of a print job so that the printer that receives the notification acquires the job and performs the print.

In the service using the Internet as described above, not only the remote terminal but also the processing apparatus connected to the server sometimes functions as the terminal using the service. Specifically, the service user operates a user interface included in the processing apparatus, for example, so as to give an instruction for printing an image on the Web to the server. This instruction causes the server to issue a print job, and notifies the processing apparatus of the issued print job. This notification causes the processing apparatus to perform the print. In such a mode, it is not necessary to constantly connect the processing apparatus to the server because a job is not notified from a remote terminal.

However, an unnecessary connection between the printer and server is sometimes established when the printer is constantly connected to the server while the printer is in the power-on state as described in Japanese Patent No. 5565346.

SUMMARY OF THE INVENTION

An objective of the present invention is to provide an information processing system in which the connection between a processing apparatus and a server is appropriately established, an information processing method, a server, a processing apparatus, and a program.

The information processing system according to the present invention includes one or more servers and a processing apparatus. The one or more servers include: a first transmission unit configured to transmit a job to the processing apparatus in response to a request from the processing apparatus; and a second transmission unit configured to transmit a job to the processing apparatus in response to a request from a device different from the processing apparatus when the processing apparatus has already been registered in a predetermined registration process. The processing apparatus includes a performance unit configured to perform a predetermined process in accordance with the job transmitted from the first transmission unit or the second transmission unit. The connection between the processing apparatus and the one or more the servers to transmit a job to the processing apparatus with the first transmission unit and the second transmission unit is established depending on whether the predetermined registration process has already been performed.

Further features of the present invention will become apparent from the following description of exemplary embodiments (with reference to the attached drawings).

DESCRIPTION OF THE EMBODIMENTS

An embodiment according to the present invention will be described in detail hereinafter with reference to the appended drawings.

Figure 1:
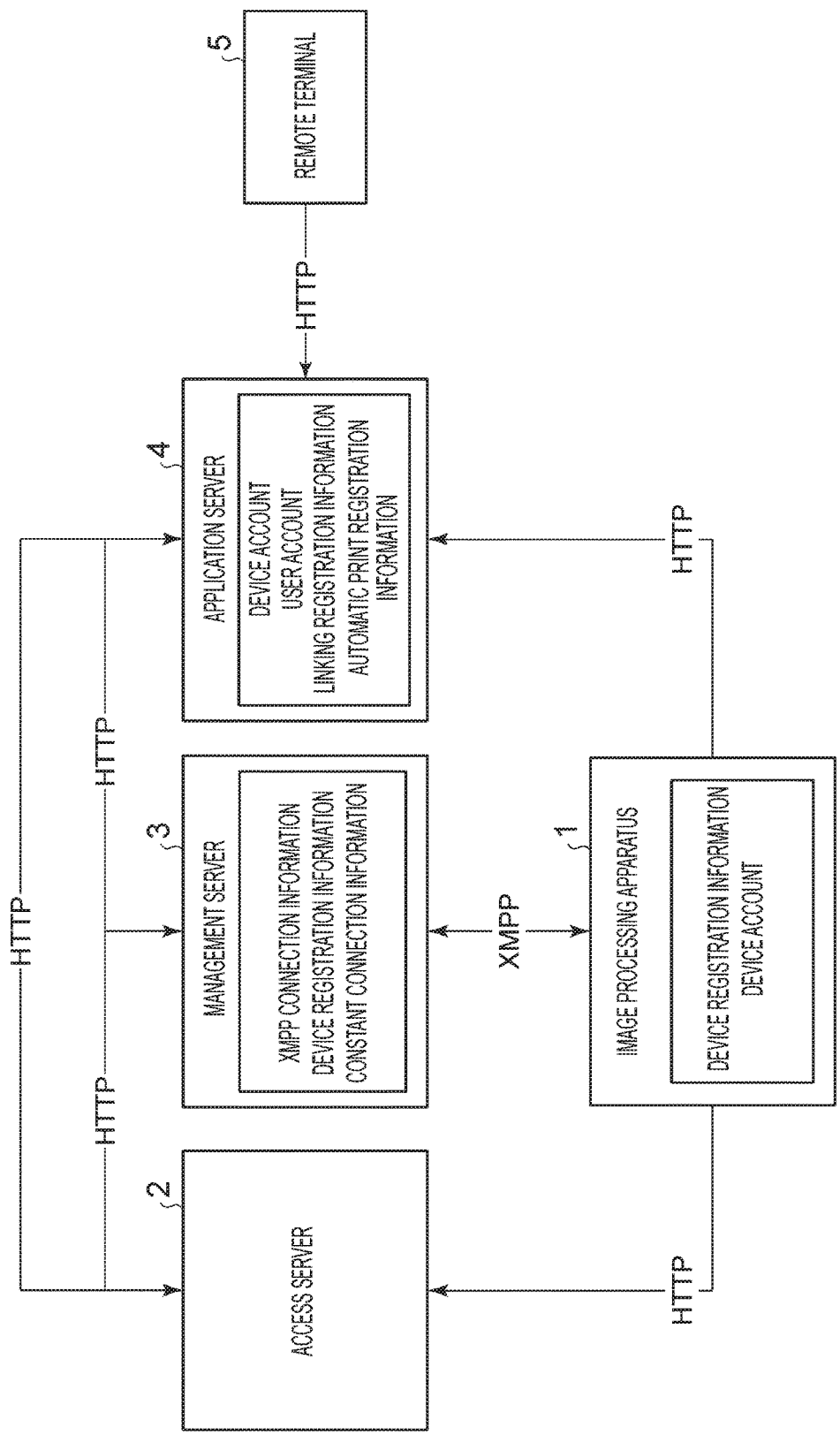
FIG. 1 is a diagram of the configuration of an information processing system.

FIG. 1 is a diagram of the configuration of an information processing system according to the present embodiment. The information processing system illustrated in FIG. 1 provides an image processing service that can cause an image processing apparatus to print an image or read a document by using the Internet. Specifically, the user of the image processing service gives an instruction for printing or reading by using the operation unit of a remote terminal 5 or the operation unit of an image processing apparatus 1. This instruction causes an access server 2, a management server 3, and an application server 4 to perform a process for notifying the image processing apparatus 1 of a print job or a read job. Thus, the image processing apparatus 1 performs the print or the reading of the document. The information processing system will be described in detail hereinafter.

The image processing apparatus 1 is an exemplary processing apparatus to perform a job, and includes, for example, a printing function to print an image onto a print medium or a reading function to read a document. Furthermore, the image processing apparatus 1 can be connected to the Internet and thus can access the access server 2, management server 3, application server 4 described below via the Internet.

The remote terminal 5 is, for example, a PC, a mobile phone, a smartphone, or a tablet. The remote terminal 5 is installed with a Web browser so as to access the application server 4 via the Internet. Furthermore, the access server 2, the management server 3, and the application server 4 can communicate with each other via a network.

The access server 2 is configured to provide the information used to connect the image processing apparatus 1 to the management server 3. The information that the access server 2 holds includes the host name of the management server 3, a Jabber identifier (JID) used to connect the image processing apparatus 1 to the management server 3, and the information about the presence or absence of device registration (described below) and the necessity of a constant connection. The held information is stored and managed in the management server 3, in this example, so that the access server 2 inquires of the management server 3 about the information as necessary. Note that which server manages which type of information is not especially limited, and another configuration other than the configuration illustrated in FIG. 1 can be used.

Furthermore, the image processing apparatus 1 transmits a request to the access server 2 over Hyper Text Transfer Protocol (hereinafter, HTTP), and can acquire the information used to be connected to the management server 3 by receiving a response.

The management server 3 is configured to manage a plurality of image processing apparatuses (including the image processing apparatus 1) using the image processing service. Specifically, the management server 3 registers the identification information about the image processing apparatuses so as to manage the registered information as the device registration information. The management server 3 also stores the constant connection information indicating whether the image processing apparatus of which identification information is registered needs to be constantly connected to the management server 3.

The image processing apparatus 1 can exchange messages by being connected to the management server 3 over Extensible Messaging and Presence Protocol (hereinafter, referred to as XMPP) in accordance with the information provided from the access server 2. The image processing apparatus 1 acquires the constant connection information stored in the management server 3 so as to determine in accordance with the constant connection information whether to constantly be connected to the management server 3 over XMPP. The process for the determination will be described below.

The application server 4 is configured to provide an image processing service with an image processing application to the users of the image processing apparatus 1 and the remote terminal 5. The application server 4 receives a request over HTTP and sends a response. In order to use the service provided from the application server 4, the user needs to create an account in the application server 4, using a terminal including a Web browser, such as a PC or a smartphone. Note that the terminal used to create an account is not limited to the image processing apparatus 1 or the remote terminal 5, and can be various terminals. The application server 4 stores the account created as described above as the user account.

The application server 4 stores the device accounts of the image processing apparatuses (including the image processing apparatus 1). The device account is used when each of the image processing apparatuses accesses the application server 4 to use the service. The accounts are individually issued for the image processing apparatuses.

By performing the procedure for registering the image processing apparatus 1 on the management server 3 (the device registration process), the image processing apparatus 1 can acquire the device account to access the application server 4. This device registration enables the image processing apparatus 1 to receive the notification of a job from the management server 3. The device registration process will be described below.

In order to use the service by accessing the application server 4 via the remote terminal 5, it is necessary to create a user account in the application server 4. The application server 4 performs a linking registration to link the user account to the device account of the image processing apparatus 1 registered on the management server 3 as a device so that the linking registration information is stored in the application server 4. Note that the operation that the user does to cause the application server 4 to perform the linking registration is referred to as device addition in the present embodiment.

The information stored and managed in the management server 3 includes the XMPP connection information used to connect the image processing apparatus 1 to the management server 3. The information stored and managed in the application server 4 includes the automatic print registration information. The application server 4 provides an automatic print service, for example, that distribute the information about the news or the weather forecast to an image processing apparatus so as to the image processing apparatus to print the information under a predetermined condition (for example, a predetermined date and time). The automatic print registration information indicates the image processing apparatus that uses the automatic print service.

The application server 4 determines in accordance with the linking registration information and the automatic print registration information whether the constant connection is necessary, and notifies the management server 3 of the constant connection information. The management server 3 stores and manages the notified constant connection information.

For example, an image processing apparatus, of which device account is registered and for which linking registration information is not stored, can transmit a request for usage of a service (for example, a printing service) to the application server. However, a print job or a read job is not issued from a remote terminal different from the image processing apparatus to the image processing apparatus because the linking registration information about the image processing apparatus is not stored. Thus, the image processing apparatus can determine that it is not necessary to constantly be connected to the management server 3 in order to acquire a print job and a read job from the remote terminal. Thus, in this example, the application server 4 notifies the management server 3 of the constant connection information indicating that the constant connection between the image processing apparatus and the management server 3 is unnecessary. On the other hand, the image processing apparatus 1 for which linking registration information is stored needs to appropriately recognize the print job or read job issued from the remote terminal at an arbitrary time. Thus, the application server 4 notifies the management server 3 of the constant connection information indicating that the constant connection between the image processing apparatus 1 and the management server 3 is necessary.

The management server 3 generates the XMPP connection information in accordance with the constant connection information notified from the application server 4. Specifically, when the constant connection information indicates that the constant connection over XMPP is necessary, the management server 3 generates the XMPP connection information so as to constantly connect the image processing apparatus 1 to the management server 3 over XMPP. On the other hand, when the constant connection information indicates that the constant connection over XMPP is unnecessary, the management server 3 generates the XMPP connection information so as not to constantly connect the image processing apparatus 1 to the management server 3 over XMPP (so as to establish the XMPP connection when required). The image processing apparatus 1 determine to constantly be connected to the management server 3 over XMPP by acquiring the XMPP connection information from the management server 3.

The system including three servers, the access server 2, the management server 3, and the application server 4 is illustrated in FIG. 1 as an example. Note that, however, the system is not limited to the example. For example, the system can include a server having the functions of the three servers, or the functions of the three servers can be shared by four or more servers and included in a system.

Figure 2:
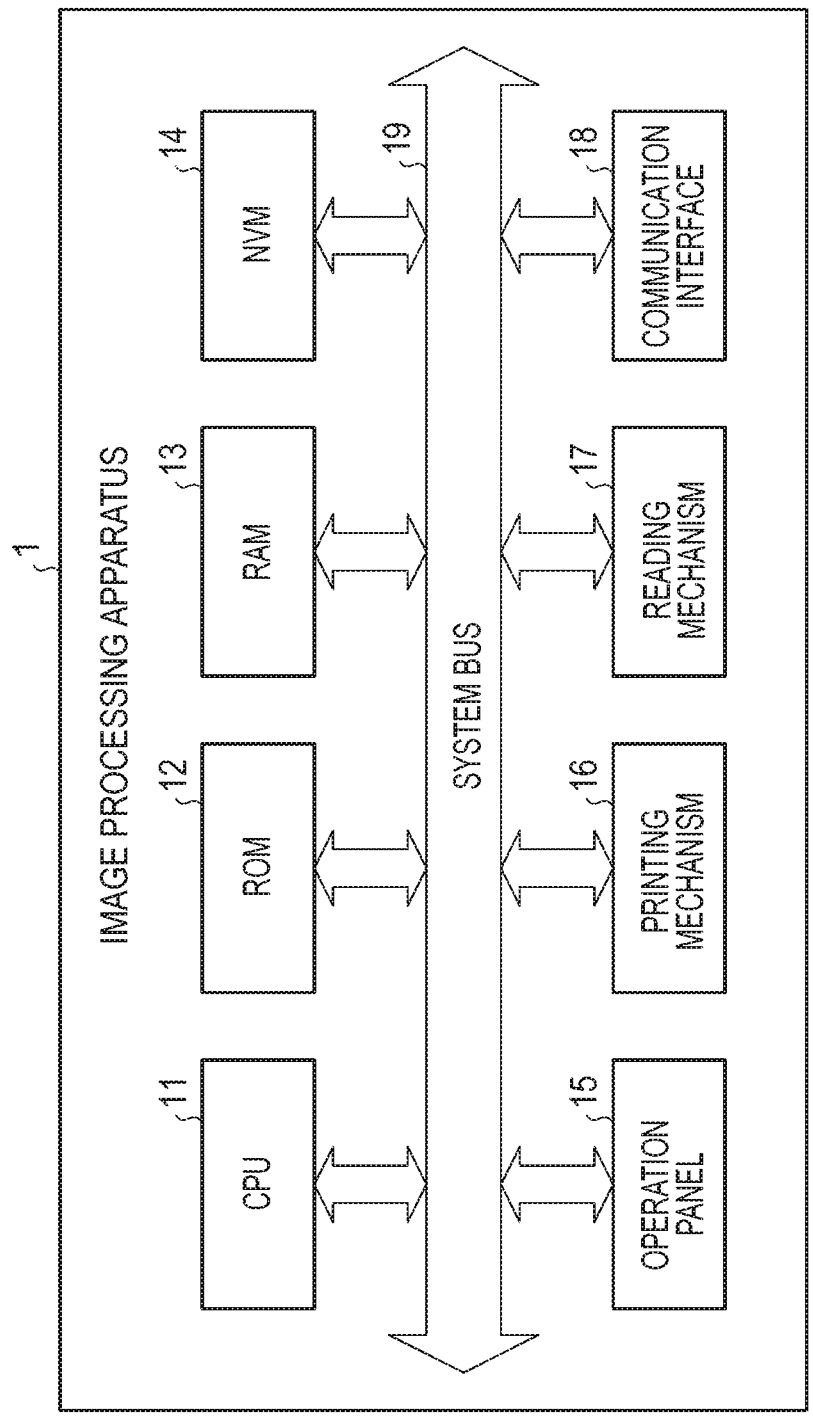
FIG. 2 is a block diagram of the configuration of an image processing apparatus 1.

FIG. 2 is a block diagram of the configuration of the image processing apparatus 1 according to the present embodiment. In the drawing, the reference sign 11 indicates a CPU, 12 indicates a ROM, 13 indicates a RAM, 14 indicates a non-volatile memory (NVM), 15 indicates an operation panel, 16 indicates a printing mechanism, 17 indicates a reading mechanism, 18 indicates a communication interface, and 19 indicates a system bus.

The image processing apparatus 1 operates by the power supplied from a power supply unit (not illustrated). The CPU 11 controls the image processing apparatus 1 in accordance with the program stored in the ROM 12 while using the RAM 13 as a working area. The non-volatile memory 14 is a readable and writable memory configured to hold the stored contents even when the non-volatile memory 14 is not supplied with the power. The printing mechanism 16 performs a print in accordance with the control by the CPU 11. The reading mechanism 17 reads an image in accordance with the control by the CPU 11. The communication interface 18 is used to communicate with an external device. The components are connected to each other via the system bus 19 so that the components can be controlled.

The image processing apparatus 1 performs HTTP and XMPP communications via the communication interface 18. The operation panel 15 includes an LCD display screen. The image processing apparatus 1 includes a built-in Web browser so that the Web browser displays a Hyper Text Markup Language (HTML) document provided in the HTTP communications on the LCD display screen.

The image processing apparatus 1 uses HTTP to communicate with the access server 2, and uses XMPP to communicate with the management server 3. The image processing apparatus 1 uses HTTP to communicate with the application server 4. The image processing apparatus 1 especially displays the Web page provided by a Web service by acquiring the HTML document via the built-in Web browser from the application server 4 so as to enable the user to use the service. Alternatively, the user can use the Web service by accessing the application server 4 via a remote terminal 5 including a Web browser other than the image processing apparatus 1.

Note that each of the access server 2, the management server 3, and the application server 4 also includes a processor such as a CPU, a non-volatile memory such as a ROM or a hard disk, and a work memory such as a RAM. The CPU of each of the access server 2, the management server 3, and the application server 4 performs various controls according to the present embodiment by executing a program stored in each ROM or hard disk on the work memory.

Figure 3:
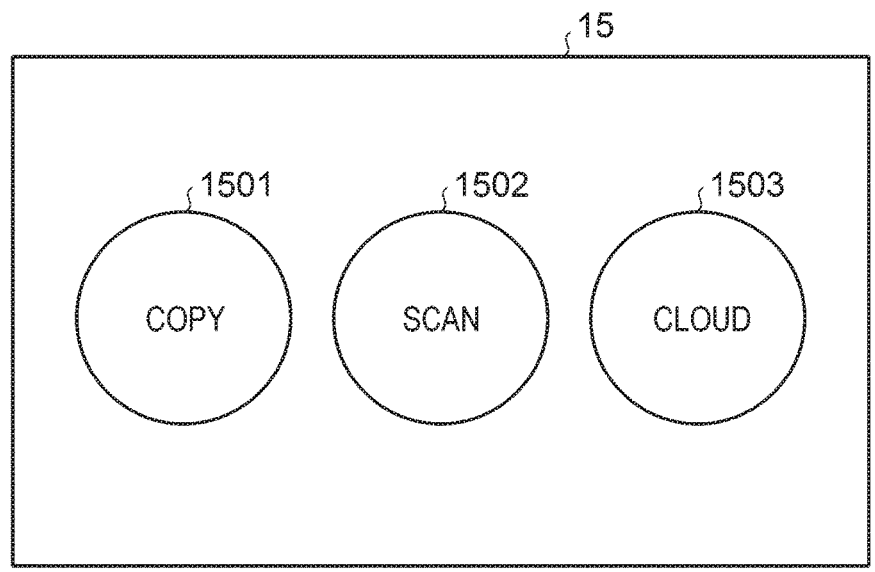
FIG. 3 is a diagram of an exemplary LCD display screen on an operation panel.

FIG. 3 illustrates an exemplary LCD display screen on the operation panel 15. In the drawing, the reference sign 1501 indicates an icon for copy operation, 1502 indicates an icon for scan operation, and 1503 indicates an icon for cloud operation. The cloud operation according to the present embodiment is an operation to start the Web browser built in the image processing apparatus 1 in order to use the service from the application server 4. The user of the image processing apparatus 1 gives an instruction for the operation indicated on the icon via the operation panel. The user starts the Web browser built in the image processing apparatus 1 by operating the cloud icon 1503.

The image processing apparatus 1 performs a process described below with reference to FIG. 4 so as to determine to establish an XMPP connection to the management server 3. The process is performed when the image processing apparatus 1 is turned on and starts.

Figure 4:
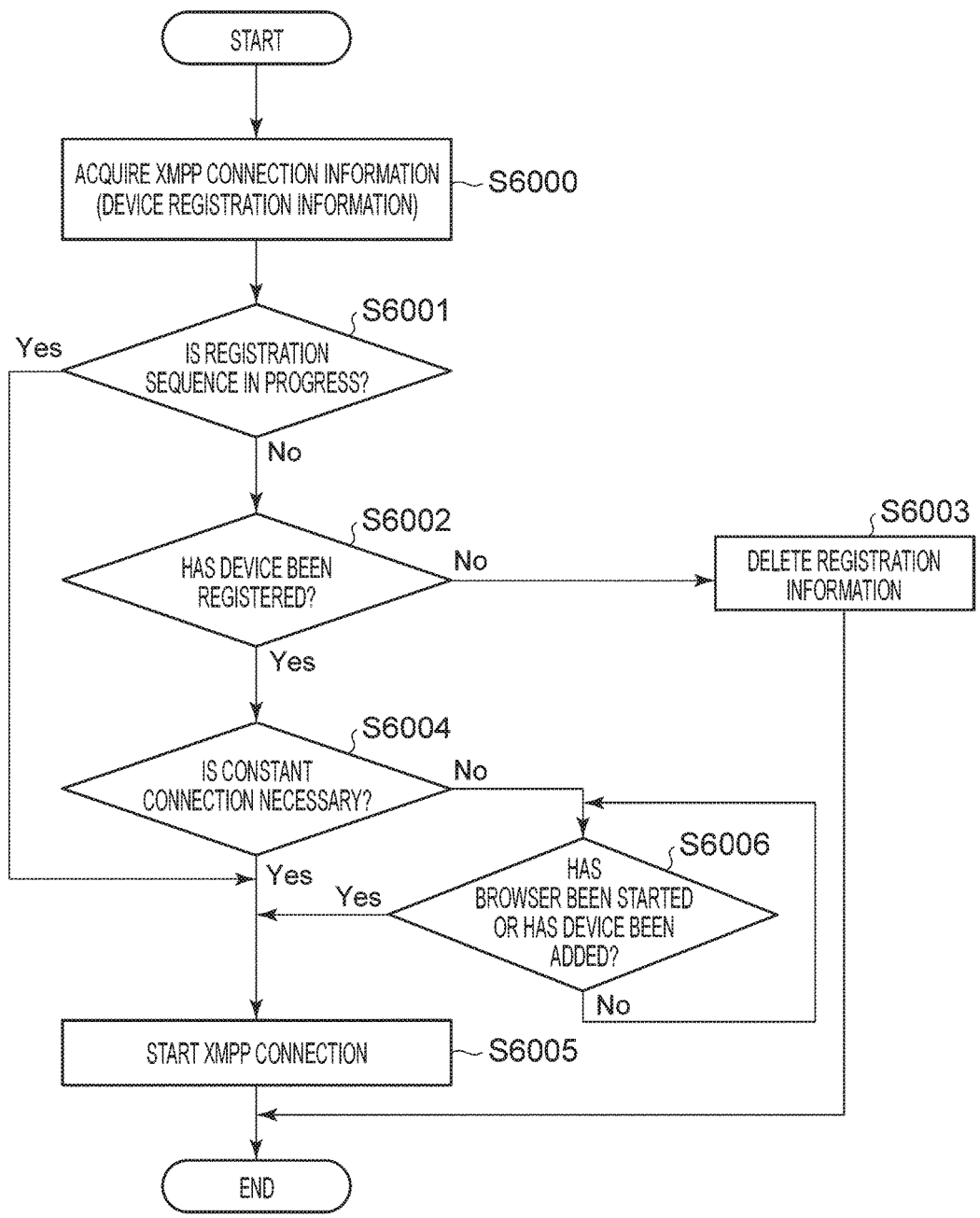
FIG. 4 is a flowchart of a process in which the image processing apparatus determines whether to establish an XMPP connection by acquiring the XMPP connection information.

FIG. 4 is a flowchart of a process in which the image processing apparatus 1 determines to establish an XMPP connection by acquiring the XMPP connection information. The process of the flowchart illustrated in FIG. 4 is performed by the execution of the program stored in the ROM 12 on the RAM 13 by the CPU 11.

In S6000, the CPU 11 transmits a request to the access server 2 over HTTP, and the XMPP connection information for an XMPP connection is notified as the response to the request. When the image processing apparatus 1 is registered as a device, the device registration information is notified. In S6001, the CPU 11 determines whether the sequence for the device registration is in progress. When the device registration is completed in the management server 3, the management server 3 notifies the image processing apparatus 1 of the completion of the device registration over XMPP in the device registration sequence. Thus, an XMPP connection is necessary during the device registration sequence and the process goes to S6005. The CPU 11 starts an XMPP connection to the management server 3 in S6005.

In S6002, the CPU 11 determines whether the image processing apparatus 1 is registered as a device by determining whether the response from the server includes the device registration information. If the image processing apparatus 1 is not registered as a device, the connection to the server is disconnected and the device registration is deleted. Thus, in S6003, the CPU 11 deletes the device registration information stored in the image processing apparatus 1, and the process is terminated. Thus, the XMPP connection between the image processing apparatus 1 and the management server 3 is not established. This can prevent the image processing apparatus 1 from being connected to the management server 3 in an XMPP connection when the device registration is deleted from the server and the service is not available.

In S6004, the CPU 11 determines whether a constant XMPP connection with the management server 3 is necessary in accordance with the XMPP connection information provided in S6000. As described above, the application server 4 notifies the management server 3 of the constant connection information in accordance with the linking registration information. For example, when the device account of the image processing apparatus 1 is not linked to the user account of the service user (when a job is not issued from the remote terminal to the image processing apparatus 1), the image processing apparatus 1 determines that the constant connection with the management server 3 over XMPP is unnecessary.

On the other hand, when the device account of the image processing apparatus 1 is linked to the user account in the application server 4 (when a job can be issued from the remote terminal to the image processing apparatus 1), the image processing apparatus 1 determines that the constant connection with the management server 3 over XMPP is necessary.

When the image processing apparatus 1 determines that the constant connection is necessary in S6004, the process goes to S6005 so that the CPU 11 establishes the XMPP connection. When the image processing apparatus 1 determines that the constant connection is unnecessary in S6004, the process goes to S6006.

In S6006, the CPU 11 determines whether the Web browser starting operation or the device adding operation is performed. When the operation is performed, an XMPP connection to the management server 3 is required in order to make the service available or link the image processing apparatus 1 to the user account. Thus, when the CPU 11 determines that the Web browser starting operation or the device adding operation is performed in S6006, the CPU 11 starts establishing an XMPP connection to the management server 3 in S6005. On the other hand, when the CPU 11 determines that the Web browser starting operation or the device adding operation is not performed in S6006, the process in S6006 is repeated. This can appropriately establish an XMPP connection when the user performs the Web browser starting operation or the device adding operation.

In the process illustrated in FIG. 4, when it is determined in S6004 that the constant connection over XMPP is unnecessary in accordance with the XMPP connection information provided from the management server 3, the connection over XMPP is not started. Thus, for example, when the image processing apparatus 1 is turned on and the image processing apparatus 1 is not linked to and not registered on the application server 4, the XMPP connection is not established. This can prevent an XMPP connection from being established without the notification of a job from the remote terminal when the image processing apparatus 1 is turned on.

In the process illustrated in FIG. 4, when the user performs the operation to use the service or to link the image processing apparatus 1 to the user account in the linking registration, the establishment of an XMPP connection is started. Thus, even if an XMPP connection is not established when the image processing apparatus 1 is turned on as described above, the XMPP connection can be started when required.

When the device account of the image processing apparatus 1 is linked to the user account in the linking registration (when the remote terminal can issue a job to the image processing apparatus 1), the XMPP connection is established when the image processing apparatus 1 is turned on. Thus, when the user of the remote terminal instructs issuance of a job at an arbitrary time and the image processing apparatus 1 is in the power-on state, the XMPP connection is established. This enables the image processing apparatus 1 to perform a predetermined process (printing or document reading) in accordance with the job issued as described above.

Note that, while the Web browser is in operation, it is necessary to maintain the XMPP connection as described above in order to receive the notification of the job created by the image processing apparatus 1 or the remote terminal 5. The XMPP connection is unnecessary after the Web browser is terminated. Note that, however, the notification of the job created while the Web browser is in operation is sometimes received after the Web browser is terminated. Thus, the XMPP connection is maintained for a predetermined period of time even after the Web browser is terminated. The XMPP connection is maintained in a similar manner when the device adding operation is performed.

Figure 5:
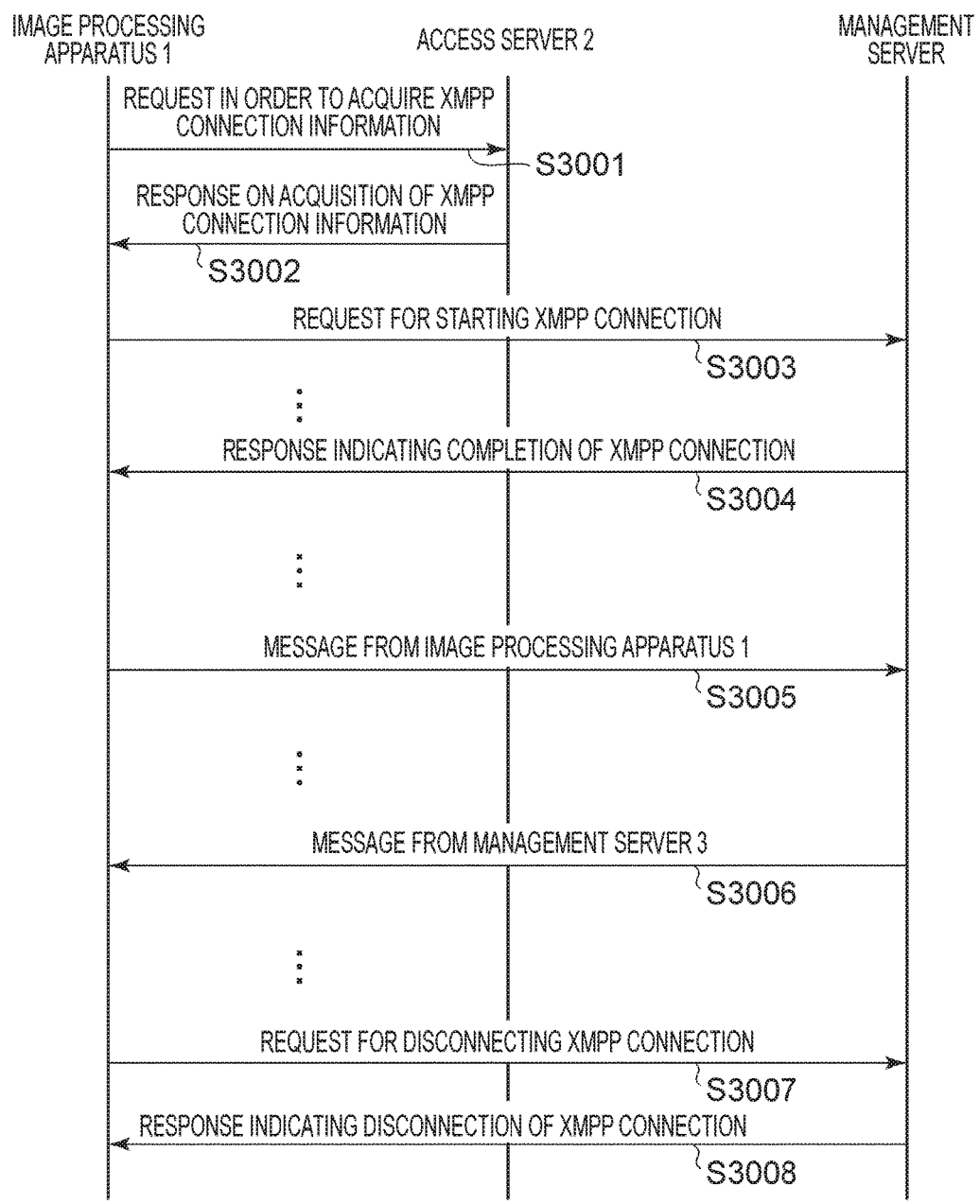
FIG. 5 is a sequence diagram of an XMPP connection process that the image processing apparatus performs while communicating with an access server and a management server.
Figure 6:
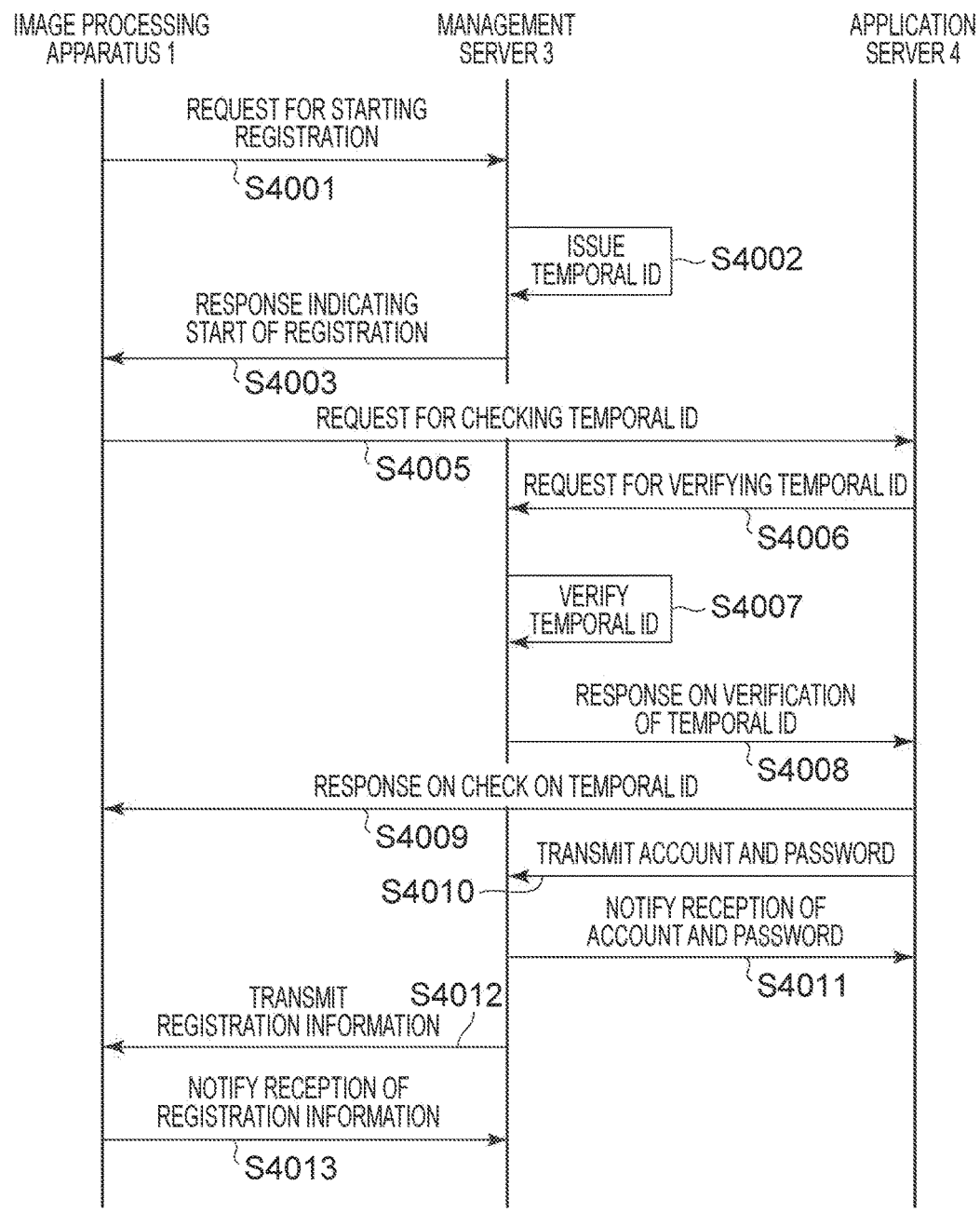
FIG. 6 is a sequence diagram of a device registration process that the image processing apparatus performs while communicating with the management server.
Figure 8:
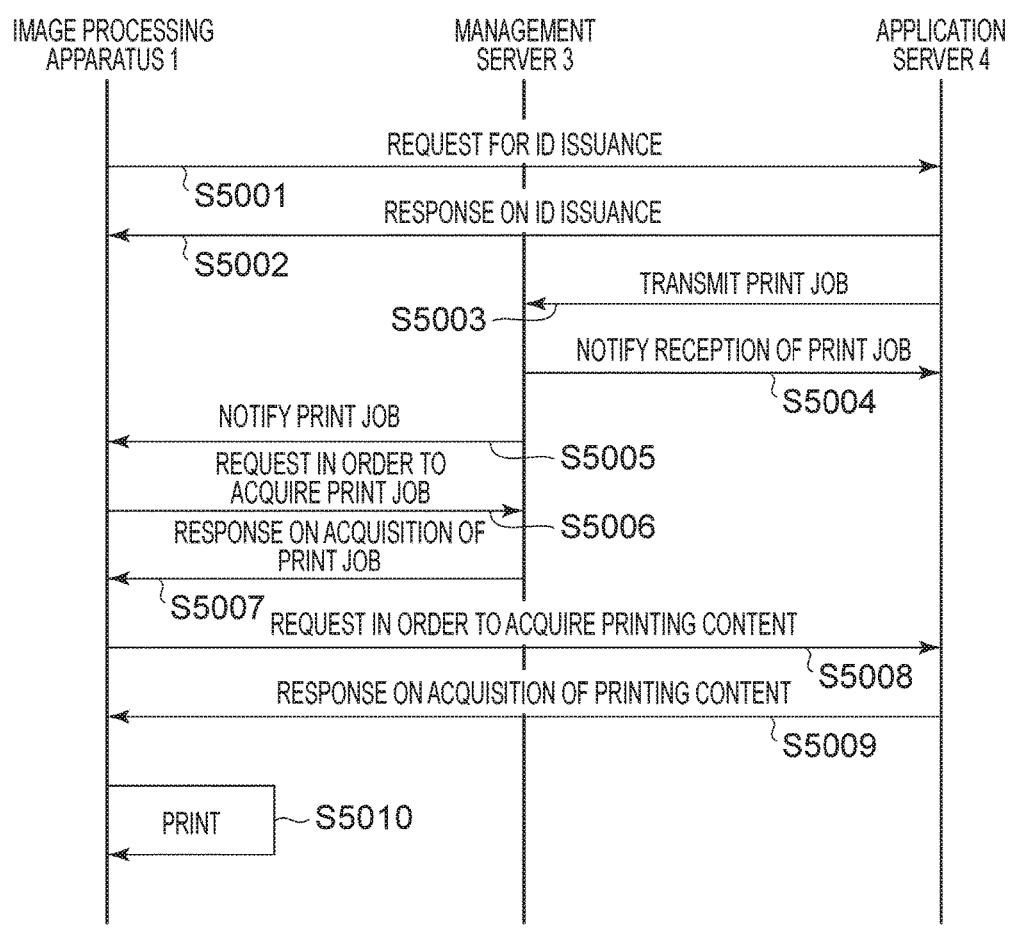
FIG. 8 is a sequence diagram of a device ID adding process that the image processing apparatus performs while communicating with the management server and an application server in order to add the image processing apparatus as a device.

FIG. 5 is a sequence diagram of an XMPP connection process that the image processing apparatus 1 performs while communicating with the access server 2 and the management server 3. The process in steps of the sequence diagram is implemented by the execution of the programs stored in the ROM or a hard disk on a work memory such as the RAM by the CPU included in each of the image processing apparatus 1, the access server 2, and the management server 3. The processes illustrated in FIGS. 6 and 8 are implemented in a similar manner.

In S3001, the image processing apparatus 1 transmits a request to the access server 2 over HTTP in order to acquire the XMPP connection information. In S3002, the image processing apparatus 1 receives the response to the request in S3001 from the access server 2. The reception in S3002 corresponds to the acquisition of the XMPP connection information in S6001 of FIG. 4. The image processing apparatus 1 determines whether to start the XMPP connection in accordance with the response from the access server 2 in S3002, similarly to the process illustrated in FIG. 4.

When the image processing apparatus 1 determines to start the XMPP connection in S3002, the image processing apparatus 1 transmits a request for an XMPP connection to the management server 3 in S3003. After that, the image processing apparatus 1 communicates with the management server 3 in accordance with the procedure for the XMPP connection so as to establish the XMPP connection in S3004. The establishment of the connection enables the image processing apparatus 1 and the management server 3 to exchange messages in S3005 and S3006.

In order to disconnect the XMPP connection after a predetermined period of time elapses from the termination of the Web browser in the image processing apparatus 1, the image processing apparatus 1 transmits a request to the management server 3 to disconnect the XMPP connection in S3007. In S3008, when the image processing apparatus 1 receives the response to the request in S3007 from the management server 3, the XMPP connection is disconnected.

FIG. 6 is a sequence diagram of the device registration process that the image processing apparatus 1 performs while communicating with the management server 3. The sequence illustrated in FIG. 6 is started in a state in which the XMPP connection between the image processing apparatus 1 and the management server 3 is established by the process in S3004 illustrated in FIG. 5.

In S4001, the image processing apparatus 1 transmits a request to the management server 3 to start device registration. When receiving the request in S4001, the management server 3 issues a temporal ID used to check the device registration in S4002. Then, the management server 3 transmits the temporal ID to the image processing apparatus 1 in S4003 as the response to the request in S4001.

When receiving the temporal ID in S4003, the image processing apparatus 1 transmits a request over HTTP in S4005 to the application server 4 to check the temporal ID. When receiving the request in S4005, the application server 4 transmits a request to the management server 3 to verify the temporal ID in S4006. Note that the requests in S4005 and S4006 include the temporal ID that the image processing apparatus 1 receives in S4003.

When receiving the request in S4006, the management server 3 performs a verification process in S4007 for verifying the temporal ID issued in S4002 against the temporal ID included in the temporal ID verification request in S4006. Then, the management server 3 transmits a response indicating the result of the verification process to the application server 4 in S4008. When receiving the response in S4008, the application server 4 transmits the result of the check on the temporal ID as the response to the request in S4005 to the image processing apparatus 1 in S4009. Note that the check result includes the information indicating whether the temporal ID is verified. When the temporal ID is not verified, the image processing apparatus 1 displays an error message on the operation panel 15.

When the response from the management server 3 in S4008 is the information indicating that the compared IDs are identical, the application server 4 creates an account for the image processing apparatus 1. Then, the application server 4 transmits the identifier of the account and the password to the management server 3 in S4010. In S4011, the management server 3 notifies the application server 4 of the fact that the management server 3 receives the account identifier and the password in S4010. In S4012, the management server 3 transmits the account identifier, the password, and a verification token to the image processing apparatus 1. The image processing apparatus 1 stores the information that is the account identifier, the password, and the verification token in a non-volatile memory such as the ROM 12 or the non-volatile memory 14, and notifies the management server 3 of the fact that the image processing apparatus 1 receives the stored information in S4013.

By the process illustrated in FIG. 6, the device registration information about the image processing apparatus 1 is stored in the management server 3. This storage enables the image processing apparatus 1 to use a cloud service via the application server 4.

Note that the image processing apparatus 1 performs the XMPP connecting process when the Web browser starts by the user's operation on the operation panel 15 and the XMPP connection is not established. When the image processing apparatus 1 is not registered as a device at the XMPP connecting process, the image processing apparatus 1 is registered as a device in the process illustrated in FIG. 6. When the image processing apparatus 1 starts the Web browser and displays the service for the first time, for example, the license to use the service is displayed and the license agreement is confirmed.

When the device registration has been completed at the start of the Web browser, or when the device registration is completed at the start of the Web browser, the list of applications registered on the service is displayed.

Figure 7:
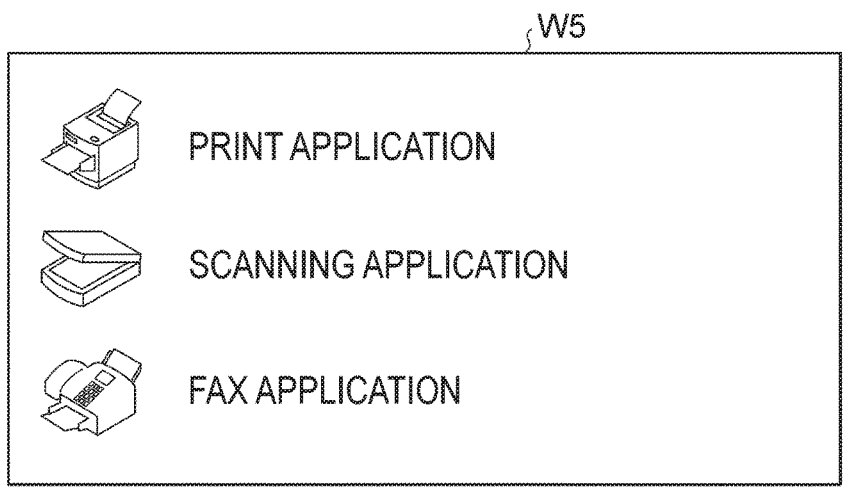
FIG. 7 is a diagram of an exemplary display screen on the operation panel of the image processing apparatus when the Web browser starts.

FIG. 7 illustrates an exemplary display screen on the operation panel 15 of the image processing apparatus 1 when the Web browser starts. The list of applications registered on the service is displayed on the screen. A print application, a scanning application, and a fax application are displayed in this example. For example, the user can create a print job with the print application via the application server 4, and can create a read job with the scanning application via the application server 4.

As described above, completing the device registration process by the process illustrated in FIG. 6 enables the user of the image processing apparatus 1 to issue a job via the application server 4 by operating the operation panel 15 in the image processing apparatus 1. However, when only the process illustrated in FIG. 6 is completed, the linking registration information linking the image processing apparatus 1 and the user account is not stored in the application server 4. This hinders issuance of a job from the remote terminal 5 to the image processing apparatus 1. Thus, the image processing apparatus 1 is added as a device through the process illustrated in FIG. 8 and the image processing apparatus 1 and the user account are linked in the application server 4.

FIG. 8 is a sequence diagram of a device ID issuing process that the image processing apparatus 1 performs to add the image processing apparatus 1 as a device while communicating with the management server 3 and the application server 4. In this example, the image processing apparatus 1 is connected to the management server 3 in the XMPP connection by the process in S3001 to S3004 in FIG. 5.

In S5001, the image processing apparatus 1 transmits a request over HTTP to the application server 4 to issue a device ID. When receiving the request in S5001, the application server 4 transmits a response indicating that the application server 4 receives the request to the image processing apparatus 1 in S5002. When receiving the response from the application server 4 in S5002, the image processing apparatus 1 gets into standby mode to wait for a notification of a print job or a read job.

When receiving the request to issue a device ID in S5001, the application server 4 creates a printing content corresponding to the device ID and issues a print job instructing the print of the content. In S5003, the application server 4 transmits the issued print job to the management server 3 over HTTP. When receiving the print job in S5003, the management server 3 notifies the application server 4 of the fact that the management server 3 receives the transmitted print job. Furthermore, the application server 4 notifies the image processing apparatus 1 of the presence of the print job over XMPP in S5005. Note that the notification does not include the printing content and includes the information indicating that the print job has been issued.

When receiving the notification of the print job in S5005, the image processing apparatus 1 transmits a request to the management server 3 over XMPP in S5006 in order to acquire the job information. When receiving the request in S5006, the management server 3 transmits the job information to the image processing apparatus 1 over XMPP in S5007. The job information does not include the printing content and includes the printing content URL that is the location information indicating the location of the printing content. In the present embodiment, the printing content is stored in the application server 4, and the printing content URL indicates the storage area of the application server 4 in which the printing content is stored.

When receiving the job information in S5007, the image processing apparatus 1 requests the printing content to the printing content URL included in the job information over HTTP in S5008. When receiving the request in S5008, the application server 4 transmits the printing content to the image processing apparatus 1 over HTTP in S5009. When receiving the printing content, the image processing apparatus 1 prints the printing content in S5010.

Note that the application server 4 creates a URL unique to the device ID issued in response to the request received in S5001. The unique URL is a URL of a Web page provided by the application server 4 to add the image processing apparatus 1 as a device. The printing content includes the URL of the verification page in addition to the device ID. In S5010, the URL uniquely issued to the image processing apparatus 1 is printed.

The user accesses the URL included in the printing content printed with the image processing apparatus 1 by the device ID issuing sequence illustrated in FIG. 8, using the Web browser in various terminals such as a PC or a smartphone. Then, the login screen to log in to the user account of the service user is displayed.

Figure 9:
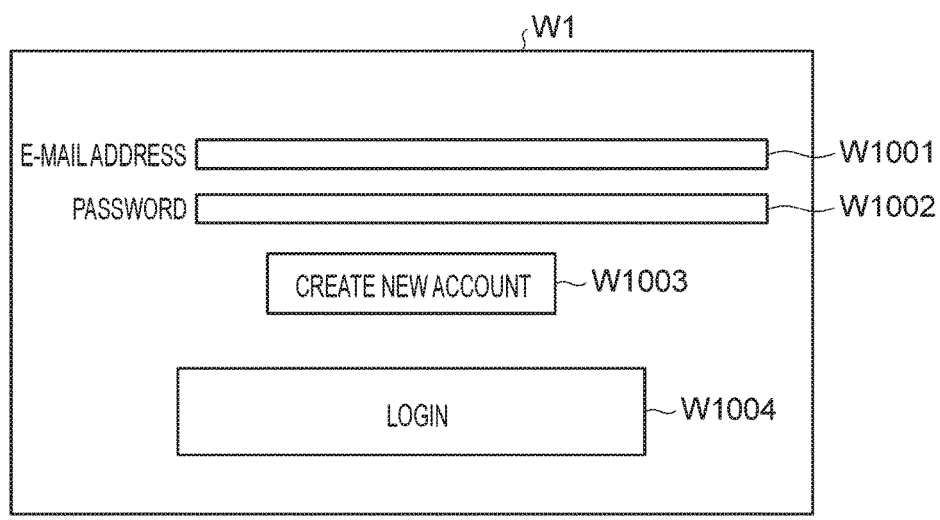
FIG. 9 is a diagram of an exemplary login screen.

FIG. 9 is a diagram of an exemplary login screen. A screen W1 includes an email address input box W1001, a password input box W1002, a new account creating button W1003, and a login button W1004. In this example, the user's email address is used as the identifier of the user account.

The user logs in to the service by inputting the email address, and the password, and clicking the login button W1004. When the user does not have an account, the user clicks the new account creating button W1003 to perform an account creating operation.

Figure 10:
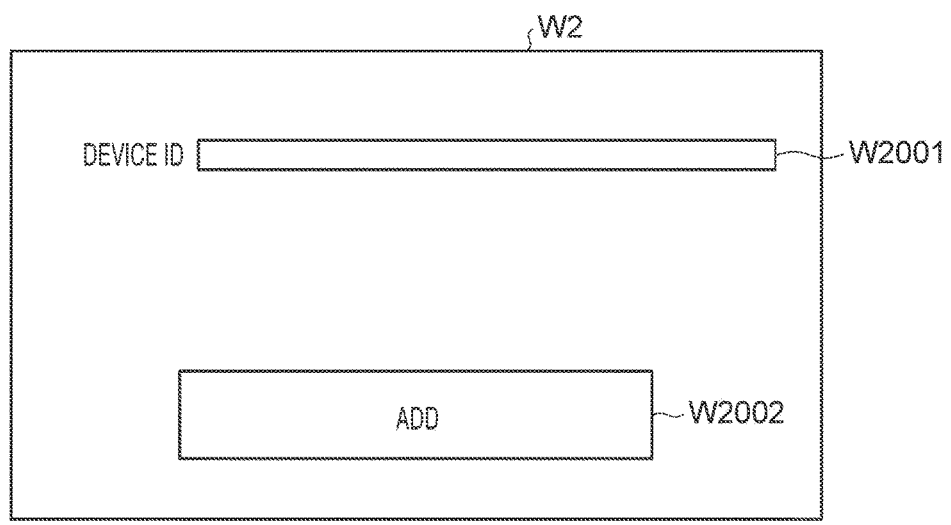
FIG. 10 is a diagram of an exemplary device addition screen.

FIG. 10 is a diagram of an exemplary device adding screen. The screen is displayed when the user logs in to the service. A screen W2 in FIG. 10 includes a device ID input box W2001, and an addition button W2002. The user inputs the device ID included in the printing content printed in S5010 of FIG. 8 to the device ID input box W2001, and clicks the addition button W2002. When the addition button W2002 is clicked, the input device ID is transmitted to the application server 4. When receiving the device ID, the application server 4 links the user account to the image processing apparatus 1 in the linking registration, and stores the linked information in a database. When the linking registration is completed, the completion is notified from the application server 4 to the management server 3.

Once the linking registration is completed as described above, the user can log in to the service as the user linked to the device ID of the image processing apparatus 1 by accessing the application server 4 via the remote terminal 5 and inputting the email address and password. Then, the user can transmit a print job to the image processing apparatus 1 via the application server 4 and the management server 3, using the remote terminal 5.

Note that, when the image processing apparatus 1 is added as a device as described above and the remote terminal 5 transmits a request to the application server 4 to issue a job, the remote terminal 5 transmits the request over HTTP. Specifically, the request including the information designating an image to be printed is transmitted to the application server 4. The application server 4 notifies the management server 3 of the print job including the image processing apparatus 1 linked to the user account used when the remote terminal 5 logs in to the service. Note that the subsequent process is performed similarly to the process in S5003 to S5010 of FIG. 8. This causes the image processing apparatus 1 to print the image designated by the remote terminal 5. In S5005, the print job is notified from the management server 3 to the image processing apparatus 1 over XMPP. Thus, the image processing apparatus 1 needs to be connected to the management server 3 in an XMPP connection in order to receive the print job.

Note that the image processing apparatus 1 transmits an inquiry about the presence or absence of a job to the management server 3 over HTTP when the image processing apparatus 1 is turned on in the process of FIG. 4. In response to the inquiry, the management server 3 notifies the image processing apparatus 1 of the presence or absence of the job over HTTP, similarly to the process in S5003. When the presence of the job from the management server 3 over HTTP is notified, the image processing apparatus 1 prints the job with a process similar to the process in S5004 to S5010.

Similarly to from the remote terminal 5, when the user transmits an instruction for issuance of a print job from the operation panel 15 of the image processing apparatus 1, the request of the print is notified to the application server 4 over HTTP. The request is similar to the request from the remote terminal 5. Thus, the application server 4 and the management server 3 do not need to switch the processes depending on whether the device used to transmit an instruction for issuance of the job is the image processing apparatus 1 or another device (for example, the remote terminal 5). This enables the image processing apparatus 1 to perform the job in a process common to the instructions from the image processing apparatus 1 and from another device. When the image processing apparatus 1 instructs the application server 4 to issue a print job, the print job is notified from the management server 3 to the image processing apparatus 1 over XMPP, as described above. However, differently from the remote terminal 5, when the image processing apparatus 1 instructs the application server 4 to issue a print job, the XMPP connection can be established at a time when the user instructs the operation panel 15 to perform the print.

Note that, when the completion of the linking registration is notified, the management server 3 stores the information indicating that the constant connection is necessary as the constant connection information. In such a case, the image processing apparatus 1 acquires the information indicating that the constant connection is necessary as the XMPP connection information in S6001 of FIG. 4. When the image processing apparatus 1 is not added as a device (when the image processing apparatus 1 is not linked to the user account), the management server 3 stores the information indicating that the constant connection is unnecessary as the constant connection information.

Accordingly, when the image processing apparatus 1 has been added as a device through the process in S6004 of FIG. 4 and can receive a job from the remote terminal 5, the image processing apparatus 1 starts the XMPP connection to the management server 3 at the same time when the image processing apparatus 1 is turned on. This is because the user can create a job by accessing the application server 4 via the remote terminal 5 once the linking registration is completed, and thus the image processing apparatus 1 can receive a job notification at any time.

On the other hand, when the image processing apparatus 1 is not added as a device and a job is not issued by the operation of an external device such as the remote terminal 5, the establishment of a constant XMPP connection between the image processing apparatus 1 and the management server 3 at a time when the image processing apparatus 1 is turned on can be prevented.

Figure 11:
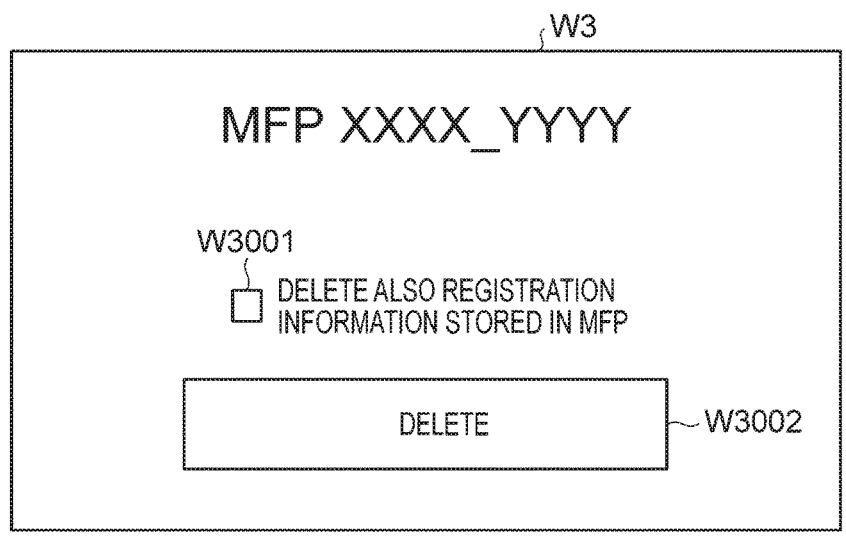
FIG. 11 is a diagram of an exemplary printer deletion page.

The print added as illustrated in FIG. 10 can be deleted from the printers that the remote terminal 5 causes to perform a job. FIG. 11 illustrates an exemplary printer deletion screen. The user accesses the Web page for deleting a printer and inputs the email address and the password. Then, the printer deletion page illustrated in FIG. 11 is displayed.

FIG. 11 is a diagram of an exemplary printer deletion screen. The screen W3 includes a check box W3001 used to determine whether to delete the information stored in the image processing apparatus 1 and a deletion button W3002. An input to the screen W3 by the user can delete the linking information linking the user account of the user and the device ID of the image processing apparatus 1 in the application server 4. When the check box W3001 is ticked, the device registration information about the image processing apparatus 1 is also deleted as well as the linking registration information.

When the user clicks the deletion button W3002, the deletion of the printer is notified together with the information indicating whether the check box is ticked to the application server 4. When receiving the notification, the application server 4 updates the information stored in the database so as to disable the linking information linking the user account and the device ID. Then, the application server 4 notifies the management server 3 of the completion of the update. When receiving the notification, the management server 3 gives a notification to the image processing apparatus 1.

When the check box is ticked, the deletion of the device registration information is notified from the application server 4 to the management server 3. When the check box is not ticked, the fact that the constant connection is unnecessary is notified from the application server 4 to the management server 3. This is because, once the linking registration is deleted, a job is not created by the operation of the remote terminal 5, and thus a job is created only when the image processing apparatus 1 is operated. Thus, in such a case, the image processing apparatus determines that the constant connection is unnecessary in the determination process in S6004 of FIG. 4.

Figure 12:
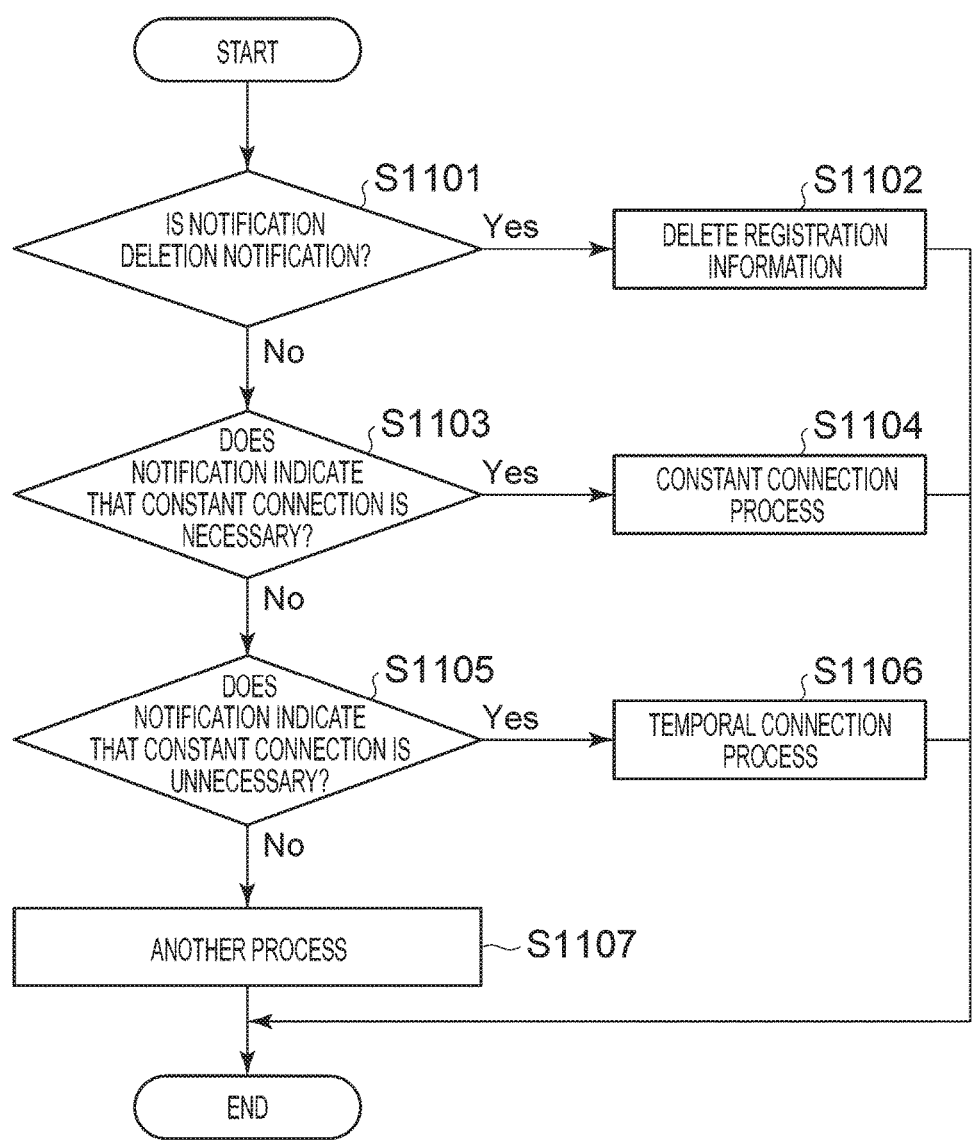
FIG. 12 is a flowchart of a process that the image processing apparatus performs when receiving a notification message from the management server.

FIG. 12 is a flowchart of a process that the image processing apparatus 1 performs when receiving a notification message from the management server 3. The process of the flowchart illustrated in FIG. 12 is performed by the execution of the program stored in the ROM 12 on the RAM 13 by the CPU 11.

When the image processing apparatus 1 receives a notification, the CPU 11 determines whether the notification is a deletion notification in S1101. When the notification is a deletion notification, the CPU 11 deletes the device registration information stored in the non-volatile memory in S1102, and disconnects the XMPP connection to the management server 3.

In S1103, the CPU 11 determines whether the received one is a notification indicating that the constant connection is necessary. When the notification indicates that the constant connection is necessary, the CPU 11 performs a process for a constant connection in S1104. The CPU 11 maintains the XMPP connection by stopping the timer for disconnection in the constant connection process.

In S1105, the CPU 11 determines whether the received one is a notification indicating that the constant connection is unnecessary. When the notification indicates that the constant connection is unnecessary, the CPU 11 performs a process for a temporal connection in S1106. The CPU starts the timer for disconnection in the temporal connection process so as to disconnect the XMPP connection after a predetermined period of time elapses. The connection is maintained for the predetermined period of time because the job created during the constant connection is sometimes delivered late. When the image processing apparatus 1 receives another notification, the CPU 11 performs another process in S1107.

When the image processing apparatus 1 is not linked to the user account in the linking registration, for example, the usage of the image processing apparatus 1 for an automatic print service is sometimes registered in the application server 4. The automatic print service is a service in which the information, for example, about the news or the weather forecast is distributed to the image processing apparatus at a predetermined time so that the image processing apparatus 1 prints the information. For the automatic print service, a print job needs to be issued independently from the operation of the image processing apparatus 1. Thus, the image processing apparatus 1 needs to be constantly connected to the management server 3 over XMPP.

In light of the foregoing, the image processing apparatus 1 is constantly connected to the management server 3 in the present embodiment if the image processing apparatus 1 is registered as the device to perform an automatic print service in the application server 4.

Figure 13:
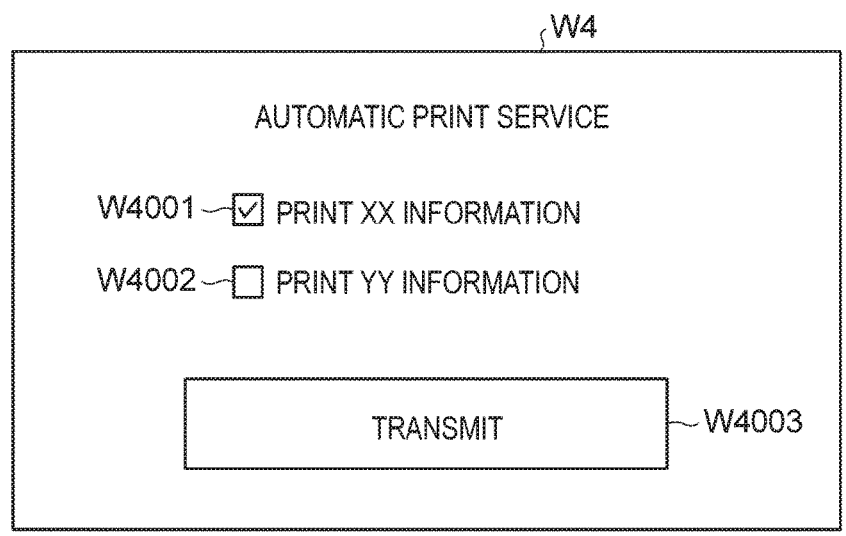
FIG. 13 is a diagram of an exemplary screen for registering an automatic print service.

FIG. 13 is a diagram of an exemplary registration screen for an automatic print service. The automatic print service is a service displayed when the built-in Web browser starts by the operation of the operation panel of the image processing apparatus 1. A check box W4001 and a check box W4002 are used to select the information to automatically be printed. When the user clicks a transmission button W4003, the device ID of the image processing apparatus 1 is transmitted together with the information of which check box is ticked to the application server 4. When receiving the information, the application server 4 registers the transmitted device ID as the device to perform the automatic print service in the database. In accordance with the tick on the check box, the information to automatically be printed is also registered in the database.

Meanwhile, the application server 4 notifies the management server 3 of the constant connection information indicating that the constant connection is necessary. This notification causes the image processing apparatus 1 to establish a constant connection to the management server 3 through the process illustrated in FIG. 4 when the usage of the image processing apparatus 1 for the automatic print service is registered. When the image processing apparatus 1 is not added as a device (in the linking registration) and the usage of the image processing apparatus 1 for the automatic print service is not registered, the information indicating that the constant connection is unnecessary is stored in the management server 3. Note that, when neither of the check boxes in FIG. 13 is ticked, the information indicating the constant connection is unnecessary is notified from the application server 4 to the management server 3.

The services requiring the contact connection between the image processing apparatus 1 and the management server 3 have been described above. Note that, however, the services described above are examples, and the services requiring the contact connection are not limited to the services described above. If there is a plurality of services requiring the contact connection and any one of the services is registered, the constant connection is necessary. If all of the services are not registered, the constant connection is unnecessary.

When a job can be issued from a device such as a remote terminal other than the image processing apparatus, the image processing apparatus is constantly connected to the management server as described above in the present embodiment. When a job is not issued from a device other than the image processing apparatus, the image processing apparatus is not constantly connected to the management server as described above in the present embodiment. If a large number of image processing apparatuses can be connected to the server, the image processing apparatuses establish their constant connections with the server only when necessary. This can reduce the load on the server.

The image processing apparatus configured to print an image or read a document has been described as an exemplary processing apparatus in the embodiment. Note that, however, the processing apparatus is not limited to the embodiment. For example, the processing apparatus can be any type of processing apparatus such as a PC, a smartphone, or a camera.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-109180, filed May 28, 2015 which is hereby incorporated by reference herein in its entirety.

What is claimed is:

1. An information processing system comprising:
one or more servers; and
a processing apparatus,
the one or more servers including one or more processors which execute a program stored in one or more memories,
wherein the one or more processors,
executes a first registration to register the processing apparatus in the one or more servers;
executes a second registration to link the processing apparatus which has been registered in the one or more servers by the first registration with a user account managed in the one or more servers;
execute a first transmission to transmit a job to the processing apparatus in response to a request from the processing apparatus in both of a first case where the second registration has been executed, and a second case where the first registration has been executed and the second registration has not been executed;
execute a second transmission to transmit a job to the processing apparatus in response to a request from a device different from the processing apparatus in the first case, wherein the second transmission is not executed in the second case, the processing apparatus including a processor which executes a program stored in a memory;
wherein the processor,
performs a predetermined process in accordance with a job transmitted by the first transmission or the second transmission,
wherein a connection between the processing apparatus and the one or more servers to transmit a job with the first transmission or the second transmission, is established at a predetermined timing without a predetermined instruction by a user, in the first case,
wherein the connection is not established at the predetermined timing in the second case, and
wherein even in the second case, the connection is established in a state that the second registration has not been performed, in accordance with the predetermined instruction.

2. The information processing system according to claim 1, wherein the one or more processors of the one or more servers further notify the processing apparatus of information based on whether the second registration has been executed,
the processor of the processing apparatus further,
determines whether to establish the connection in accordance with the information notified from a notification, at the predetermined timing, and
starts establishing the connection in a case where the processor determines to establish the connection.

3. The information processing system according to claim 1, wherein the predetermined timing corresponds to timing when the processing apparatus starts.

4. The information processing system according to claim 2, wherein
the one or more processors of the one or more servers perform the notification to the processing apparatus over a first protocol, and
the processor of the processing apparatus determines whether to establish the connection to the one or more servers over a second protocol.

5. The information processing system according to claim 4, wherein the one or more processors execute the first transmission and the second transmission to transmit a job in communication over the first protocol based on communication between the processing apparatus and the one or more servers over the second protocol.

6. The information processing system according to claim 5, wherein the one or more processors execute the first transmission and the second transmission notify the processing apparatus of presence of a job over the second protocol, and transmit a job over the first protocol in response to a response to the notification from the processing apparatus.

7. The information processing system according to claim 6, wherein the one or more processors notify the processing apparatus of presence of a job over the second protocol in response to a request from the processing apparatus or the device different from the processing apparatus over the first protocol.

8. The information processing system according to claim 4, wherein the first protocol is HTTP, and the second protocol is XMPP.

9. The information processing system according to claim 1, wherein the processing apparatus includes a printing function configured to print an image, and the one or more processors execute the first transmission and the second transmission transmit a print job to the processing apparatus.

10. The information processing system according to claim 1, wherein the processing apparatus includes a reading function configured to read a document, and the one or more processors execute the first transmission and the second transmission to transmit a read job to the processing apparatus.

11. The information processing system according to claim 1, wherein the one or more processors execute the second transmission to transmit a job to the processing apparatus in accordance with a predetermined condition about a date and a time.

12. The information processing system according to claim 1, wherein the predetermined instruction is an instruction for starting a web browser of the processing apparatus.

13. A processing apparatus capable of being connected to one or more servers the one or more servers including one or more processors which execute a program stored in one or more memories, wherein the one or more processors cause the processing apparatus to perform operations comprising:
  executing a first registration to register the processing apparatus in the one or more servers;
  executing a second registration to link the processing apparatus which has been registered in the one or more servers by the first registration with a user account managed in the one or more servers;
  receiving a job in accordance with a request from the processing apparatus from the one or more servers in both of a first case where the second registration has been executed, and a second case where the first registration has been executed and the second registration has not been executed, and receiving a job in accordance with a request from a device different from the processing apparatus from the one or more servers in the first case, wherein the second registration is not executed in the second case; and
  performing a predetermined process in accordance with a job received,
  wherein a connection between the processing apparatus and the one or more servers to receive a job is established at a predetermined timing without a predetermined instruction by a user, in the first case and
  wherein the connection is not established at the predetermined timing in the second case, and
  wherein even in the second case, the connection is established in a state that the second registration has not been performed, in accordance with the predetermined instruction.

14. The processing apparatus according to claim 13 wherein the one or more processors, further determines whether to establish the connection in accordance with information based on whether the predetermined process has been performed at the predetermined timing, the information being notified from the one or more servers; and
  starts establishing the connection in a case where the one or more processors determines to establish the connection.

15. The processing apparatus according to claim 13, wherein the predetermined timing corresponds to timing when the processing apparatus starts.

16. The processing apparatus according to claim 14, wherein the information is notified by the one or more processors over a first protocol, and
  the one or more processors determines whether to establish the connection to the one or more servers over a second protocol.

17. The processing apparatus according to claim 16, wherein the one or more processors receives a job in communication over the first protocol in accordance with communication to the one or more servers over the second protocol.

18. The processing apparatus according to claim 17, wherein the one or more processors receives a notification of presence of a job over the second protocol, transmits a response to the notification, and receives a job transmitted in response to the response over the first protocol.

19. The processing apparatus according to claim 16, wherein the first protocol is HTTP, and the second protocol is XMPP.

20. The processing apparatus according to claim 13, further comprising: a printing function configured to print an image, wherein the one or more processors receives a print job.

21. The processing apparatus according to claim 13, further comprising a reading function configured to read a document, wherein the one or more processors receives a read job.

22. A server capable of being connected to a processing apparatus comprising one or more processors which execute a program stored in one or more memories, wherein the one or more processors is configured to perform a predetermined process, the server performing operations comprising:
  executing a first registration to register the processing apparatus in the server;
  executing a second registration to link the processing apparatus which has been registered in the server by the first registration with a user account managed in the server;
  executing a first transmission job for performing the predetermined process to the processing apparatus in response to a request from the processing apparatus in both of a first case where the second registration has been executed, and a second case where the first registration has been executed and the second registration has not been executed;
  executing a second transmission job for performing the predetermined process to the processing apparatus in response to a request from a device different from the processing apparatus in the first case, wherein the second transmission job is not executed in the second case; and
  controlling a connection between the processing apparatus and the server to transmit a job with the first transmission job and the second transmission job so that the connection is established at a predetermined timing without a predetermined instruction by a user in the first case,
  wherein the connection is not established at the predetermined timing in the second case, and
  wherein even in the second case, the connection is established in a state that the second registration has not been performed, in accordance with the predetermined instruction.

* * * * *